United States Patent
Demma et al.

(10) Patent No.: US 6,424,146 B2
(45) Date of Patent: *Jul. 23, 2002

(54) PROXIMITY SENSOR METHOD AND APPARATUS THAT IS INSENSITIVE TO TEMPERATURE, NOISE AND LENGTH OF WIRE

(75) Inventors: Nick Anthony Demma, Minneapolis, MN (US); LeRoy Ernest Vetsch; Stephen Forrest Rogoff, both of Glendale, AZ (US)

(73) Assignee: Honeywell International Inc., Morristown, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/311,100

(22) Filed: May 13, 1999

(51) Int. Cl.[7] ............................ G01B 7/14; G01R 27/00
(52) U.S. Cl. ............................ 324/207.16; 324/207.12; 324/207.26
(58) Field of Search ....................... 324/207.12, 207.16, 324/207.26, 202, 234, 236, 327

(56) References Cited

U.S. PATENT DOCUMENTS

| | | |
|---|---|---|
| 5,066,912 A | 11/1991 | Kwiatkowski |
| 5,180,978 A | 1/1993 | Postma et al. ......... 324/207.16 |
| 5,410,488 A | 4/1995 | Andersen, III |
| 5,691,639 A * | 11/1997 | Demma et al. ......... 324/207.26 |

* cited by examiner

Primary Examiner—Gerard R. Strecker
(74) Attorney, Agent, or Firm—Kris T. Fredrick

(57) ABSTRACT

A proximity sensor for determining the gap between a sensor and a metal target which is insensitive to noise, changes in temperature of the sensor and different lengths of wire by measuring the AC conductance, DC conductance and susceptance of the sensor and using the measured values with a predetermined data base to derive the desired gap distance.

7 Claims, 2 Drawing Sheets

FIG. 3 is a block diagram of a test setup used to obtain variations of gap distance with DC conductance, AC conductance and susceptance variations; and, FIG. 4 is a graphic representation of a three dimensional volume representing one range values for the variations of DC conductance, AC conductance and susceptance each point of which corresponds to a predetermined gap distance.

PROXIMITY SENSOR METHOD AND APPARATUS THAT IS INSENSITIVE TO TEMPERATURE, NOISE AND LENGTH OF WIRE

BACKGROUND OF THE INVENTION

1. Field of the Invention

The present invention relates to proximity sensors and more particularly to a proximity sensor system in which the measurement of the distance between the sensor and the metal target is made insensitive to noise, changes in the temperature of the sensor, and different lengths of wire thereto,

2. Description of the Prior Art

U.S. Pat. No. 5,180,978 of Postma et al issued Jan. 19, 1993 and assigned to the assignee of the present invention (hereinafter the 978 patent), describes a two wire proximity sensor having a sensing coil movable into proximity with a metal member or target and provides for the direct measurement of the AC and DC resistances of the coil and, in one embodiment the imaginary impedance component i.e. the reactance. A microprocessor utilizes these values and provides an output indicative of the distance between the coil and the target. The measurement of the distance to the target affects the difference between the AC resistance and the DC resistance and this difference does not vary much with temperature. Since the wire has equal values of AC resistance and DC resistance, the effect of the wire is cancelled by taking the difference of these two resistances.

One difficulty has been encountered in the use of the invention of the 978 patent and that occurs when the lengths of the wires to and from the sensor become long enough that the capacitance introduced thereby causes phase shifts which prevent the measurement of the AC resistance of the sensor. Although using low frequency can minimize this effect, attempts to make this effect extremely small motivate the use of a frequency so low that the eddy currents in the metal target no longer produce the desired change in the AC resistance. Aircraft manufacturer requirements have been changed from requiring plus or minus 1.0 mm accuracy to requiring an accuracy of plus or minus 0.1 mm and to requiring that the measurement be insensitive to temperatures between −77° C. to +125−° C. with cable lengths of 3 m to 80 m in an unshielded twisted pair.

BRIEF DESCRIPTION OF THE INVENTION

The present invention overcomes some of the problems associated with the new accuracy requirements and allows great accuracy over extreme cable length variations with substantially no problems with noise, sensor temperature variations and capacitance. The basic change over the prior systems is to utilize DC and AC conductance and the quadrature component of AC conductance i.e. susceptance. An automated test is then set up to record these values for the various cable lengths over the full temperature and the target gap ranges to create a data base. Thereafter, the gap may be calculated using an equation that makes use of the coefficients derived from said database. Accuracies of plus or minus 0.1 mm are easily obtainable over the entire range of cable lengths and sensor temperatures.

DETAILED DESCRIPTION OF THE PREFERRED EMBODIMENTS

Figure 1:
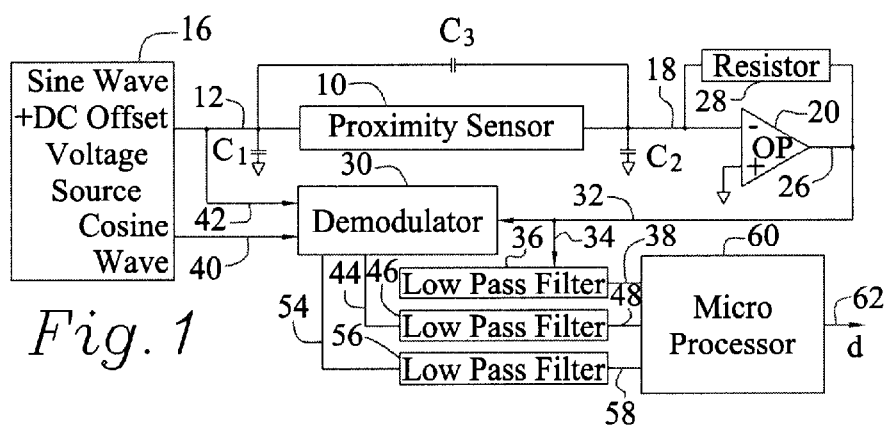
FIG. 1 is a block diagram of the basic components of the present invention.

In FIG. 1, a proximity sensor 10 which may be a coil such as used in the above mentioned 978 patent, is shown having a first end connected by a wire 12 to a voltage source 16 which produces a sine wave with a positive DC offset on line 12 to permit simultaneous measurement of both DC and AC parameters in a manner similar to that in the 978 patent. Alternatively, the sine wave could have no bias and the measurements of AC and DC parameters could be made sequentially. The capacitance introduced by wire 12 is shown as a capacitor C1 connected from line 12 to signal ground. The other end of proximity sensor 10 is shown connected by a wire 18 to the electronics of the sensing system which, for simplicity, is shown as an operational amplifier 20 with its inverting input terminal connected to wire 18 and its non-inverting input terminal connected to signal ground. The capacitance introduced by wire 18 is shown as a capacitor C2 connected between wire 18 and signal ground. The capacitance between wire 12 and wire 18 is shown by a capacitor C3 connected therebetween. Since the noninverting input of the operational amplifier is at a virtual ground, the current flowing into the summing junction at the inverting input depends on the voltage from the source and on the DC conductance and admittance of the proximity sensor 10 and its associated wires 12 and 18. The output of operational amplifier 20, on a line 26 is connected back to the negative input thereof by a resistor 28 which converts the current from the summing junction of the operational amplifier 20 to a voltage signal that is referenced to ground and the output of the operational amplifier 20 on a line 26 is a voltage that represents the DC conductance and the admittance of the proximity sensor 10 and its associated wires 12 and 18. The output on line 26 is also presented to a demodulator 30 by a line 32 and on a line 34 to a low pass filter 36 which filters out the AC signal to extract the DC conductance. The output of filter 36 is shown by an arrow 38 indicative of the DC conductance of the proximity sensor 10.

Demodulator 30 receives a cosine wave input from voltage source 16 on a line 40 and the sine wave plus DC offset input on a line 42. Demodulator 30 produces a first output on a line 44 to a low pass filter 46 which filters out the DC components and produces an output shown by an arrow 48 indicative of the AC conductance of the proximity sensor 10. A second output from demodulator 30 on a line 54 is presented to a low pass filter 56 which filters out the DC components and produces an output shown by an arrow 58 indicative of the susceptance of the proximity sensor 10. There are many readily available devices capable of producing outputs indicative of the DC conductance, the AC conductance and the susceptance on the market and other devices may be used. However, the use of the filters 36, 46 and 56 along with the synchronous demodulation results in a narrow-band system that has a high degree of noise immunity. It should also be observed that the apparatus shown in FIG. 1 has the advantage of eliminating most of the effects of the stray capacitance C1, C2 and C3. The capacitance C1 does not matter because the current that flows through it contributes no current to the summing junction at the inverting input of the operational amplifier 20. The capacitance C2 does not matter because there is no voltage across it and hence no current through it. The stray capacitance C3 between the wires has little effect on the AC conductance because the current through a capacitor is 90° out of phase with the voltage across it so it creates a quadrature signal at the output of the operational amplifier 20 and hence appears preferentially in the measurement of the susceptance rather than the AC conductance. The idealized depiction of the stray capacitance is, however, not perfectly accurate because the capacitance of the wire is intermingled with its resistance, forming a distributed network that influences all three of the measurements in a manner that is characteristic of the wire. The three DC outputs on lines 38, 48 and 58 are presented to the analog-to-digital converter inputs of a microprocessor 60 which determines the distance, d, between the sensor 10 and the target and produces an output indicative thereof on a line shown as arrow 62.

Figure 2A:
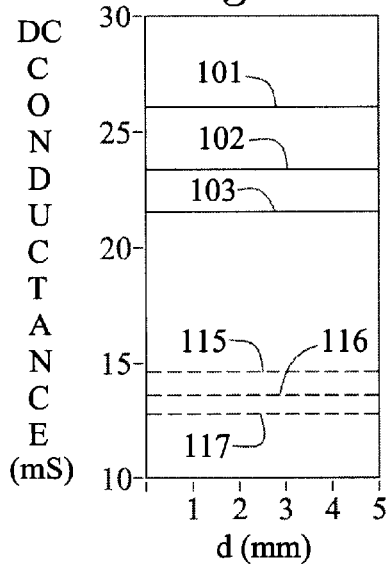
FIGS. 2a, 2b and 2c are graphs showing the variations of DC conductance, AC conductance and susceptance with gap distance.
Figure 2B:
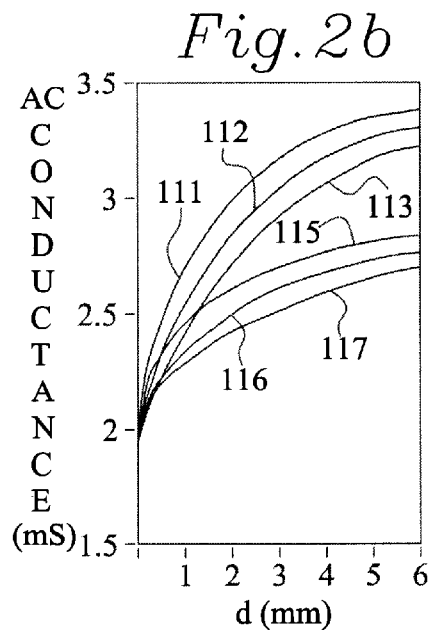
Figure 2C:
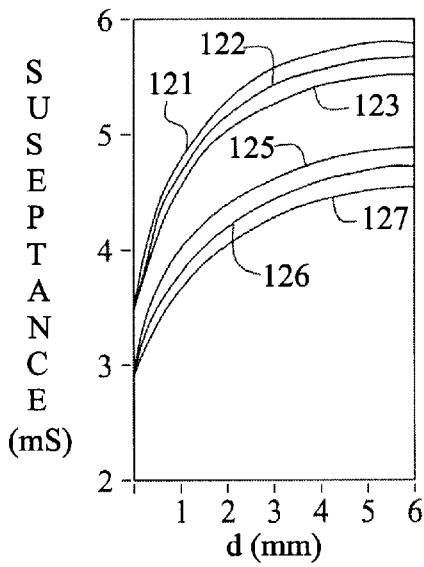

FIGS. 2a, 2b and 2c represent graphs showing the variation of DC conductance, AC conductance and susceptance with the distance, d, between the sensor and the target. Each of the graphs 2a, 2b and 2c depict two families of three curves each. Each family relates to a predetermined temperature and each curve in the family relates to values for wire lengths of 100, 200 and 300 feet respectively.

In FIG. 2a, lines 101, 102 and 103 and lines 105, 106 and 107 represent the variations of DC conductance for a family of wire lengths of 0 feet, 100 feet, and 200 feet respectively at a high temperature extreme and a low temperature extreme. It is seen that the DC conductance remains constant as the distance between the sensor and the target changes for a given wire length at either temperature extreme but that the DC conductance varies with temperature. In FIG. 2b, lines 111, 112 and 113 and lines 115, 116 and 117 represent the variations of AC conductance with distance between the sensor and the target for the same two temperature extremes and wire lengths while in FIG. 2c, lines 121, 122 and 123 and lines 125, 126 and 127 represent the variations of susceptance with distance between the sensor and the target for the same two temperature extremes and wire lengths. It is seen that for AC conductance and susceptance, the variations are non-linear with gap distance. It will also be seen that for one of the given wire lengths, one of the given temperatures, and a given gap distance, the DC conductance, the AC conductance and the susceptance can be determined. Similar families of curves for various other temperatures, wire lengths and distances, can also be drawn with the result that a large data base of measurements is obtainable over the range of conditions and, as will be seen in connection with FIG. 4, from this data base a collection of coefficients for an equation can be derived which the computer can use in an equation, to be described, to determine the gap distance from the measured values of DC conductance, AC conductance and susceptance.

Figure 3:
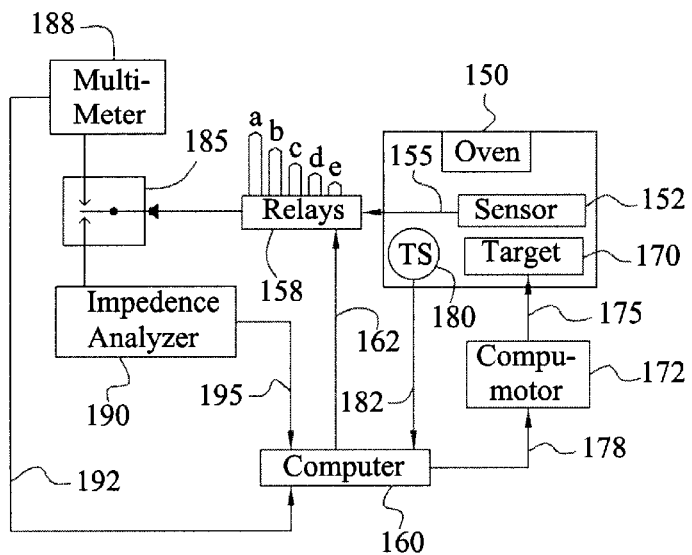

Referring now to FIG. 3, a test set up is shown in block diagram form which may be used to create the desired database. In FIG. 3, an oven 150 is shown having a sensor 152 mounted therein which is energized over a path 155 from a relay 158 which may introduce one of a plurality of wire lengths, shown as loops a, b, c, d, and e, for example, so that the readings may be taken with different wire lengths. While 5 such lengths have been shown, any number may be used to assure sufficient accuracy. The desired wire length may be chosen by a computer 160 via a line shown as arrow 162 to operate the relay 158 so as to pick one of the possible wire lengths to the sensor 152.

The sensor 152 is mounted in oven 150 proximate to a target 170 which may be very accurately positioned with respect to the sensor 152 by a "Compumotor" 172 produced by Parker Hannifin. Compumoter 172 is capable of changing the gap distance between the sensor 152 and the target 170 by 0.0001 inch increments through a mechanical connection shown as dashed arrow 175. Compumotor 172 is also controlled by computer 160 via a serial bus 178.

The exact temperature of the oven is measured by a temperature sensor 180, which sends an analog signal via line 182 to computer 160. Computer 160 includes an analog to digital converter to convert the temperatures measured by sensor 180 into digital information.

It is seen that with the equipment so far described, the various gap distances are used along with various wire lengths and various temperatures to produce a plurality of different conditions for use in making the database. The output of the sensor 152 is presented through the various wire lengths chosen by computer 160 and relay 158, to a switch 185 which alternately connects the sensor 170 to a multimeter 188 and to an impedance analyzer 190. Multimeter 188 determines the DC conductance of the sensor 152 and presents this information to the computer 160 over a digital bus 192 while impedance analyzer 190 determines the AC conductance and the susceptance of the sensor 152 and presents this information to the computer 160 over a digital bus 195.

Accordingly, it is seen that data concerning the DC conductance, the AC conductance and the susceptance of the sensor 152 is obtained for a large variety of wire lengths, temperatures and gap distances. All of this information is compiled in a database by computer 160 so that in use, the output of the sensor 152 in terms of DC conductance, AC conductance and susceptance can be used to determine the gap distance (GD) by use of a general equation:

$$GD = A + B(\text{DC Conductance}) + C(\text{DC Conductance})^2 +$$
$$C(\text{AC Conductance}) + D(\text{AC Conductance})^2 +$$
$$E(\text{Susceptance}) + F(\text{Susceptance})^2 +$$
$$G(\text{DC Conductance})(\text{AC Conductance}) +$$
$$H(\text{DC Conductance})(\text{AC Conductance}) +$$
$$I(\text{AC Conductance})(\text{Susceptance}).$$

Figure 4:
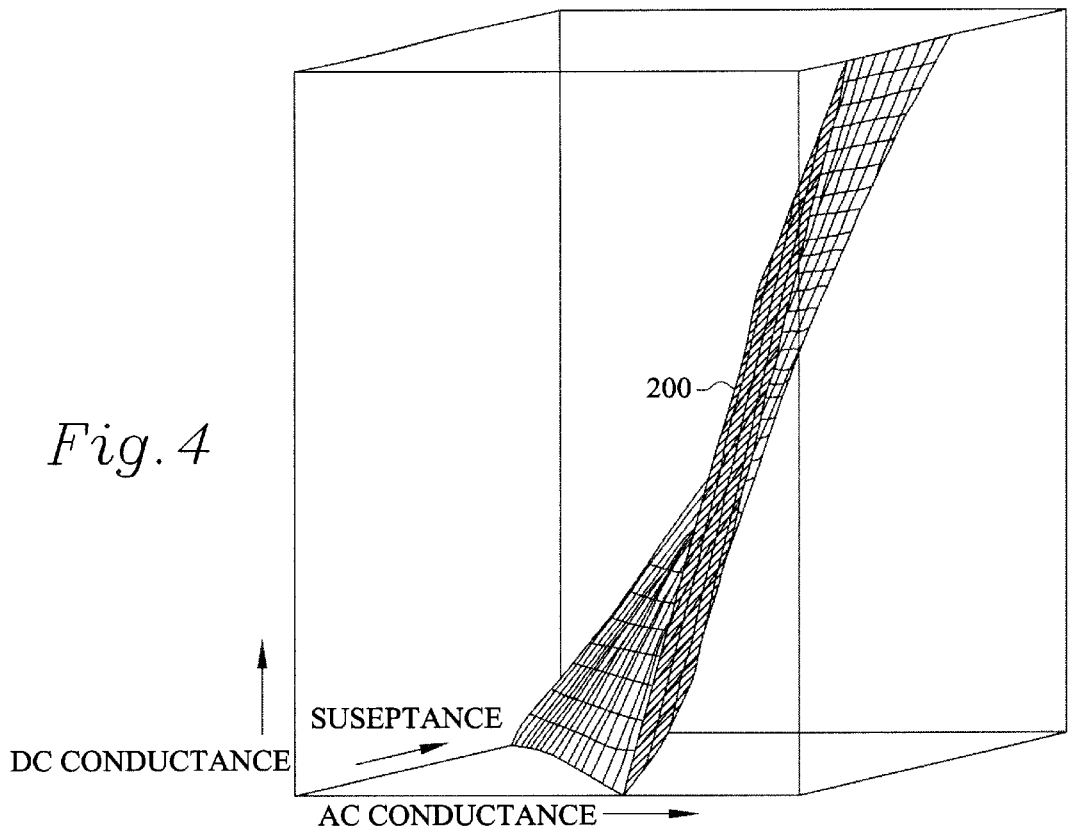

FIG. 4 shows a representation of a three dimensional volume 200 which may be created by computer 160 from the database. It will be understood that the gap distance, the sensor temperature, and the cable length have different influences on the DC conductance, the AC conductance and the susceptance, so every point in the volume 200 represents a specific set of conditions. The measurements of the DC conductance, the AC conductance and the susceptance therefore determine a specific point in volume 200 and there is only one gap distance at this point. Accordingly, it is only necessary that the gap distance values in volume 200 be described by the above equation. To obtain sufficient accuracy, volume 200 is divided into a plurality of regions and the equation describes the gap within each region by using coefficients that are appropriate for that region. These coefficients are determined by using the data points within each region along with a linear multiple regression that is familiar to those well practiced in the mathematical art. The combination of DC conductance, AC conductance and susceptance are then used to determine which region the data point is located in and these values, together with the coefficients appropriate for this region, are used in the equation that describes the gap distance as a function of the three measurements. The accuracy may be made as high as desired by dividing volume 200 into small enough regions in which the equation is very accurate.

It is therefore seen that we have provided a novel and exact way of measuring the gap between a sensor and a target to very close tolerances. Many changes will occur to those having ordinary skill in the art and we do not wish to be limited to the specific structures used in connection with the description of the preferred embodiment. Reference should be had to the following claims to determine the scope of the present invention.

What is claimed is:

1. A proximity sensor comprising:
    a detector which changes AC conductance as the gap distance between the detector and a target changes;
    DC conductance measuring means connected to the detector via one or more wires having a length sufficient to cause a non-negligible phase shift in an AC signal traveling therethrough, the DC conductance measuring means producing a first output indicative of the DC conductance of the detector and the one or more wires;
    AC conductance measuring means connected to the detector via the one or more wires, the AC conductance measuring means producing a second output indicative of the AC conductance of the detector and the one or more wires;
    susceptance measuring means connected to the detector via the one or more wires to produce a third output indicative of the susceptance of the detector and the one or more wires; and,
    data processing means connected to receive the first, second, and third outputs and operable to calculate the gap distance between the detector and the target, the data processing means using at least one equation and/or at least one database entry that is at least indirectly dependent on the first, second and third outputs to calculate the gap distance.

2. Apparatus according to claim 1 wherein the detector is a wire coil and the target is a metallic member.

3. Apparatus according to claim 1 wherein the at least one equation and/or at least one database entry is derived from a database that associates possible combinations of DC conductance, AC conductance and susceptance with gap distance.

4. Apparatus according to claim 3 wherein the database is prepared by setting a variety of gap distances between a coil and a target and by setting a variety of wire lengths of the one or more wires, and by measuring the associated DC conductance, AC conductance and susceptance.

5. Apparatus according to claim 4 wherein the coil and the target are mounted in a temperature controllable environment and the DC conductance, the AC conductance and the susceptance are measured by devices connected to the coil via one or more wires having controlled lengths.

6. Apparatus according to claim 5 wherein the controllable environment is an oven and the devices include a multimeter to measure the DC conductance and an impedance analyzer to measure the AC conductance and the susceptance.

7. A method of determining the distance between a sensor and a target, wherein the sensor is connected to a controller via one or more wires having a length sufficient to cause a non-negligible phase shift in an AC signal traveling therethrough, the method comprising the steps of:
    measuring a first value indicative of the DC conductance of the sensor and the one or more wires;
    measuring a second value indicative of the AC conductance of the sensor and the one or more wires;
    measuring a third value indicative of the susceptance of the sensor and the one or more wires;
    calculating the distance between the sensor and the target using at least one equation and/or at least one database entry that is at least indirectly dependent on the first, second and third values.

* * * * *